US012635831B2

(12) United States Patent
Lebsack et al.

(10) Patent No.: US 12,635,831 B2
(45) Date of Patent: May 26, 2026

(54) FOOD PROCESSING TOOL

(71) Applicant: DE'LONGHI BRAUN HOUSEHOLD GMBH, Neu-Isenburg (DE)

(72) Inventors: Daniel Lebsack, Neu-Isenburg (DE); Pascal Wohlfahrt, Neu-Isenburg (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 121 days.

(21) Appl. No.: 17/920,144

(22) PCT Filed: Apr. 23, 2021

(86) PCT No.: PCT/EP2021/060751
§ 371 (c)(1),
(2) Date: Oct. 20, 2022

(87) PCT Pub. No.: WO2021/214330
PCT Pub. Date: Oct. 28, 2021

(65) Prior Publication Data
US 2023/0341165 A1      Oct. 26, 2023

(30) Foreign Application Priority Data

Apr. 24, 2020    (GB) ..................................... 2006066
May 5, 2020    (LU) ...................................... 101766

(51) Int. Cl.
*A47J 43/046*        (2006.01)
*A47J 43/07*        (2006.01)
(52) U.S. Cl.
CPC ......... *A47J 43/046* (2013.01); *A47J 43/0711* (2013.01); *A47J 43/0722* (2013.01)

(58) Field of Classification Search
CPC .. A47J 43/0711; A47J 43/0722; A47J 43/046; F25C 5/046
See application file for complete search history.

(56) References Cited

U.S. PATENT DOCUMENTS

| | | | | |
|---|---|---|---|---|
| 8,056,848 B1 * | 11/2011 | Liang | .................. | A47J 43/0722 |
| | | | | 366/205 |
| 9,186,022 B1 * | 11/2015 | Jacobsen | ................. | B23P 15/02 |
| 2004/0056130 A1 * | 3/2004 | Gursel | ................ | A47J 43/0722 |
| | | | | 241/282.1 |
| 2008/0298172 A1 * | 12/2008 | Krasznai | ............. | A47J 43/0722 |
| | | | | 366/314 |

(Continued)

FOREIGN PATENT DOCUMENTS

| | | | | | |
|---|---|---|---|---|---|
| CN | 1700878 A | * | 11/2005 | .......... | A47J 43/0711 |
| CN | 101948728 B | | 12/2012 | | |

(Continued)

OTHER PUBLICATIONS

Translation of CN-104379037.*

(Continued)

*Primary Examiner* — Bobby Yeonjin Kim
(74) *Attorney, Agent, or Firm* — Harness, Dickey & Pierce, P.L.C.

(57) ABSTRACT

There is provided an ice knife for a kitchen appliance, comprising two or more blades, said blades each comprising a main section arranged at the same height, the height being configured such that processed ice collects under the main section in use.

10 Claims, 6 Drawing Sheets

(56) References Cited

U.S. PATENT DOCUMENTS

| | | | | |
|---|---|---|---|---|
| 2012/0080549 A1* | 4/2012 | Rukavina | ............ | A47J 43/0722 |
| | | | | 241/282.1 |
| 2016/0331181 A1* | 11/2016 | Dickson, Jr. | ........ | A47J 43/0722 |
| 2017/0224170 A1* | 8/2017 | Nernberger | ........... | A47J 43/046 |
| 2019/0082893 A1* | 3/2019 | Faulkner-Edwards | ...................... | |
| | | | | A47J 43/0761 |

FOREIGN PATENT DOCUMENTS

| | | | | | |
|---|---|---|---|---|---|
| CN | 104379037 A | * | 2/2015 | ......... | A47J 43/0722 |
| DE | 10001455 A1 | | 7/2001 | | |
| EP | 1127526 A2 | | 8/2001 | | |
| EP | 1545281 A1 | | 6/2005 | | |
| WO | 2005037037 A1 | | 4/2005 | | |
| WO | 2014001289 A1 | | 1/2014 | | |

OTHER PUBLICATIONS

Translation of CN-1700878.*
International Search Report and Written Opinion of the ISA issued in PCT/EP2021/060751, mailed Sep. 23, 2021; ISA/EP.
LU Search Report and Written Opinion of the Intellectual Property Office issued in Application No. LU101766, search completed Dec. 7, 2020.
Russian Office Action issued in corresponding Russian Patent Application No. 2022127465 dated Aug. 29, 2024, with English translation (9 Pages).
Chinese First Office Action for Application No. 202180026670.9 dated Mar. 14, 2025 (14 pages).
Examination report for European Patent Application No. 21 725 965.4-1015 dated Jul. 3, 2025 (5 pages).

\* cited by examiner

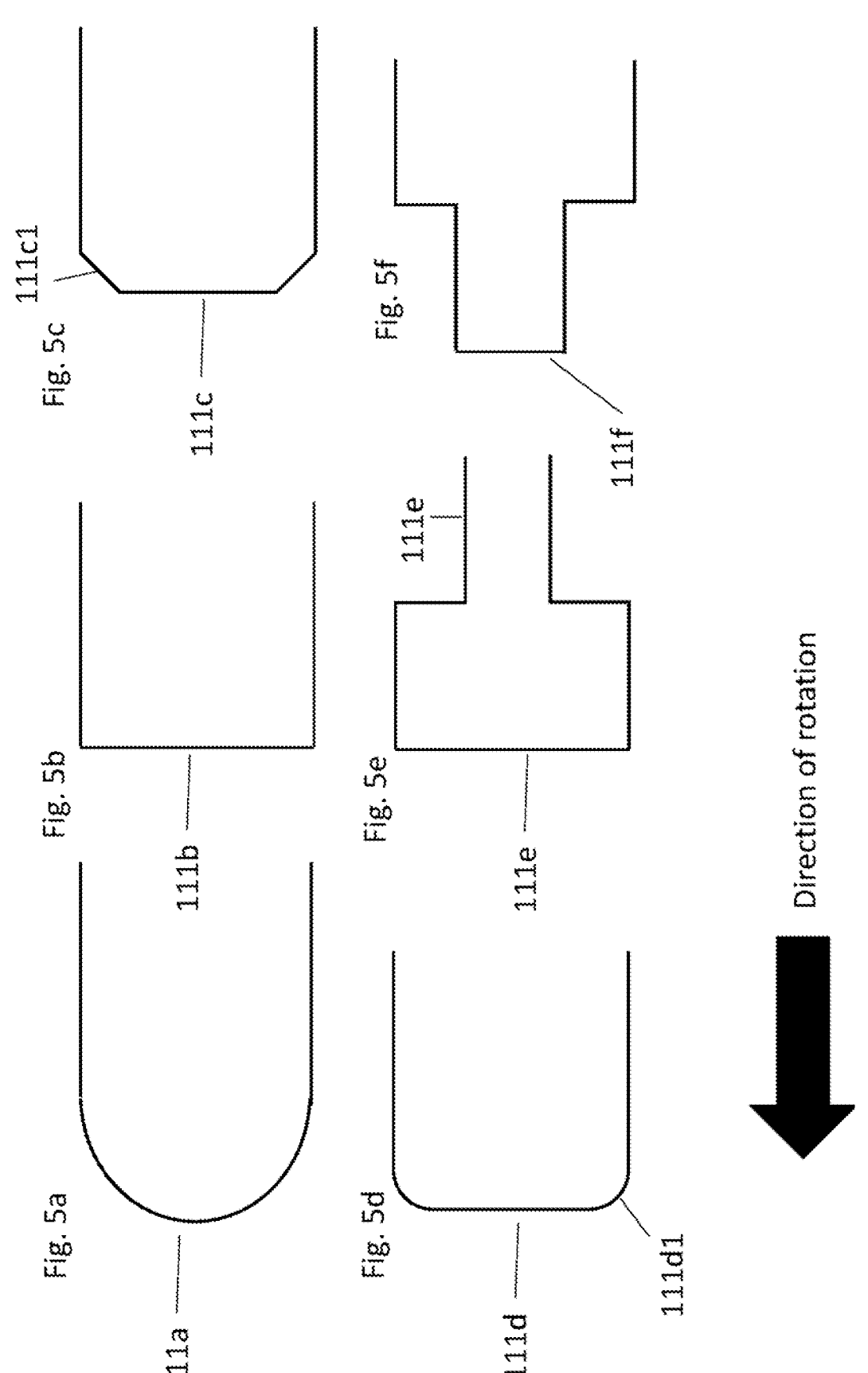

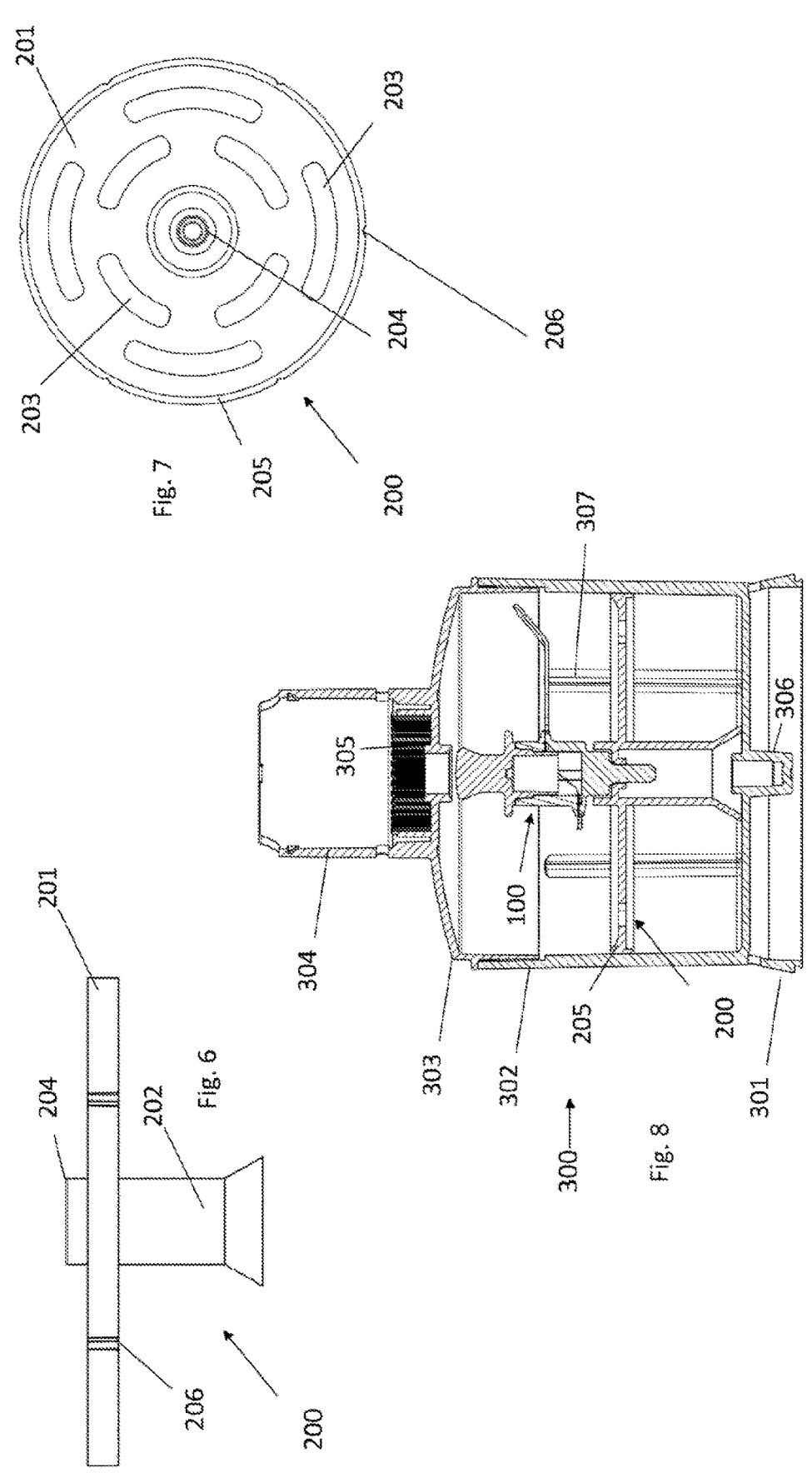

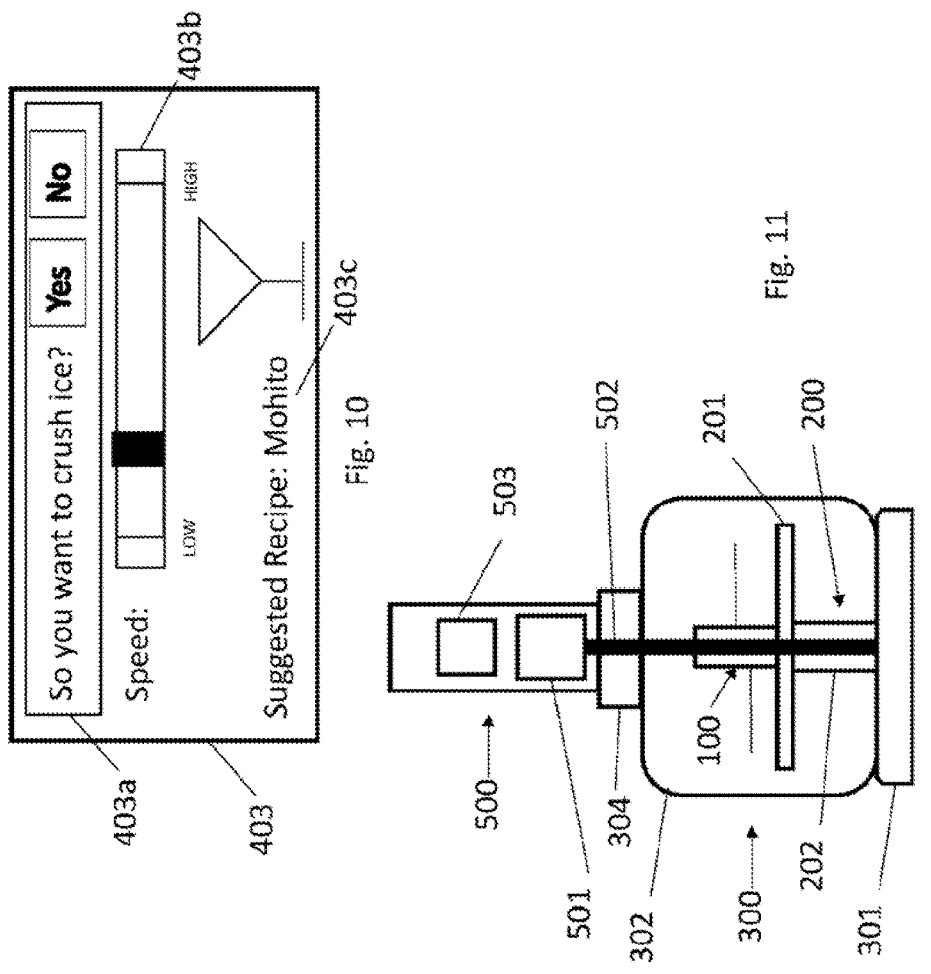
So you want to crush ice? Yes No
Speed:
LOW HIGH
Suggested Recipe: Mohito
403a
403
403b
403c
Fig. 10
Fig. 11
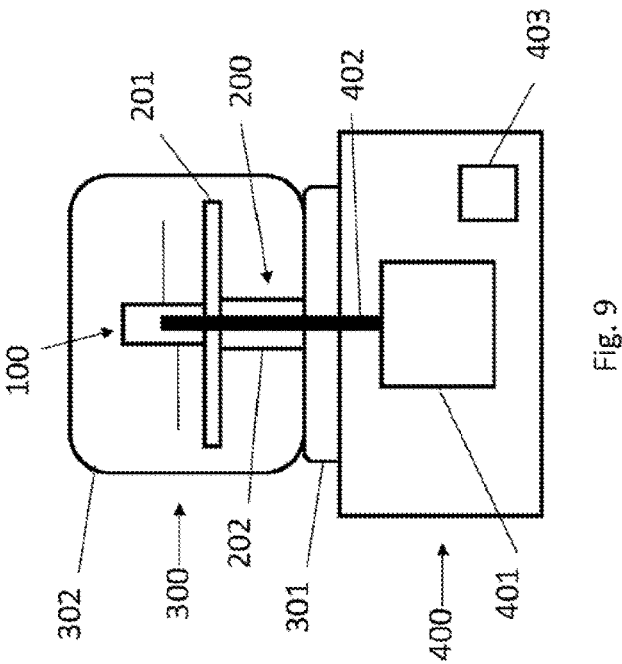
Fig. 9

503

504

501

502

500

504

503

501

502

506

FOOD PROCESSING TOOL

CROSS-REFERENCE TO RELATED APPLICATIONS

This application is a U.S. National Phase Application under 35 U.S.C. 371 of International Application No. PCT/EP2021/060751, filed Apr. 23, 2021, which claims the benefit of Great Britain Application No. 2006066.1, filed Apr. 24, 2020, and Luxembourg Application No. LU101766, filed May 5, 2020. The entire disclosure of each of the above-identified applications is incorporated herein by reference.

FIELD

The present invention relates to a food processing tool, and more specifically to a knife for a food processing appliance such as a hand-blender, and a blade assembly for use with a food processing appliance.

BACKGROUND

Handheld kitchen appliances such as hand blenders and hand mixers are often supplied with chopper attachments, which can be used to chop solid food items in smaller pieces. Such choppers consist of a bowl shaped container, a rotating tool (usually a knife with multiple cutting blades) and a lid. The handheld motor unit can be coupled to the lid, to drive the rotating tool.

It is desirable to provide tools that may also crush ice. This causes several problems.

To process softer foods, sharp blades are required. For increased performance, these blades normally exhibit a so-called "pulling cut", this means that in any point on the leading edge of the blade, the angle between a tangent line in this point and the peripheral direction of the rotation is significantly larger than 90°, usually in the area of 135°. Thus the blade is pulled through the food at an angle, instead of being pushed through the food flatly, enhancing cutting. The angle is normally chosen towards the outside, such that the blade is bent backwards away from the direction of rotation, so that food is pushed towards the outer walls of the container. At the edge of the blade the cutting speed is higher and the food is trapped between the container walls and the blade, which also enhances the cutting operation.

Unfortunately if ice cubes or other hard foods are processed, a typical sharpened knife-blade will rapidly become blunt due to collisions with the hard ice material. The performance of the knives can thus vary and become worse with increasing use. Moreover, damage to a sharpened edge can cause metal fragments to enter into the processed food, potentially affecting the health of the user.

The pulling-cut shape of the blade tends to push food outwards towards the outer walls of the container. While it is beneficial for soft foods, if the food is trapped between container wall and blade, this causes problems for hard foods. Here it can lead to blockage of the blade, which can lead to damage of the container, the knife or the motor. This is especially the case if the outer container wall contains ribs or other elements protruding into the bowl/bell within which the knife is rotating.

A typical chopper knife normally has two blades at different heights, the lower blade being required to extend close (e.g., within 5 mm) to the container bottom to process food there. This is necessary to achieve the desired fine results in most applications. However, when crushing ice very fine results are normally not desired, since this blade layouts produce more "snow" than crushed ice. Instead a certain coarseness of the result is preferred, particularly for producing ice for cocktails such as the Caipirinha.

Ice which is processed such that it has a "snow"-like texture (e.g., having an average particle/grain-size equal to or less than approximately 0.5 mm) is undesirable because it melts rapidly in liquid due to its large surface-area, thus diluting rather than simply cooling the beverages to which it is added. It also has a low density (roughly 10-100 kg/m³) and high absorbency that results in a poor, sponge-like mouth-feel when drunk with a beverage or otherwise consumed.

To overcome the issue of the dulling of blades, some manufacturers supply a separate ice knife with their device, in which the sharp blade is replaced by a serrated blade which is more robust against the hard ice, but also more difficult to manufacture. Also the general shape is otherwise still similar to the regular blade, including having a lowered blade. Therefore, it also cannot solve the blocking issue and the issue of missing coarseness.

To overcome the blocking and the coarseness issues, some manufacturers supply basket-shaped ice crusher inserts together with dedicated ice crusher knives. One such device is shown in pat. pub. no. EP1127526A2, the entire disclosure of which is hereby incorporated by reference. This device delivers the coarser processed food and reduces blockage, but is costlier and more complex, since a number of additional components are needed.

EP1545281, the entire disclosure of which is hereby incorporated by reference, on the other hand discloses an ice crusher knife with a single blade with a Z-shape, in which the main working section is raised above the container bottom by 40 mm. It is connected to the rotating stem by a 40 mm vertical section. This Z-shape design allows use of the same plastic stem as for a regular knife, which makes it cost efficient and it does also solve the coarseness issue, because it allows the finished ice to collect under the blade, without being processed further. However, it introduces a number of new disadvantages: Due to the single blade, the vibrations caused by the imbalance of the knife and the one-sided impact forces of the large ice cubes make usage inconvenient. Also the long vertical section of the blade reduces the stiffness of the blade in peripheral direction greatly, leading to frequent breakage of the plastic part during operation. Also the horizontal main section of the blade is too high above the container bottom. It effectively prevents the food from being processed too fine, but it also makes it difficult to achieve a uniform result, since also relatively big pieces can accumulate under the blade, without being processed further. This makes it necessary for the user to lift and shake the complete appliance, which is inconvenient and unsafe. Additionally, the radically differing shape of this blade to an ordinary chopper blade does not allow common tooling to be used to manufacture both of them.

It is therefore desirable to provide a tool that can at least partially ameliorate the above-described problems of the prior art.

SUMMARY OF THE INVENTION

In an aspect of the invention, there is provided an ice knife (optionally) for a kitchen appliance, comprising two or more blades, said blades each comprising a main section arranged at a height (preferably the same height; more preferably the same height as each other), the height being configured such that processed ice (i.e. ice processed by the ice knife) collects under the main section in use. This may permit satisfactory ice crushing by lifting the blades up (to the same height), whilst still potentially permitting use of common tooling with a chopper blade. It will appreciated that at least some, preferably all, of the main section of each blade is at the (same) height—that is, the main section of each blade preferably is flat and/or arranged horizontally and/or arranged parallel to a bottom surface of the kitchen appliance (or a container of the kitchen appliance), which may assist in producing processed ice having a consistent grain size. The main section of each blade may be raised above a bottom surface of the kitchen appliance (or a container of the kitchen appliance).

The height may be the height above the bottom of a part (e.g. a hub) of the ice knife, or may be the height above the bottom of a container in which the ice knife is used. The main section of each blade may thereby be raised above the hub. The bottom of the ice knife is preferably less than 5 mm, and more preferably 1-2 mm, from the bottom of the container. The height above the bottom of the container is preferably between 6 mm and 35 mm, more preferably between 11 mm and 25 mm, still more preferably between 13 mm and 14 mm. The hub is preferably part of the ice knife (and more preferably is integral with the blades)—that is, the hub is preferably not merely a shaft connected to the ice knife. The bottom of the container may be flat.

The height may be configured such that the processed ice has a grain size of more than 0.5 mm, preferably more than 2 mm, more preferably between 3 mm and 14.5 mm. The ice knife may comprise a hub from which the blades extend, preferably wherein the height of the main section above the hub is between 5 mm and 30 mm, more preferably between 10 mm and 20 mm, still more preferably approximately 12 mm. The hub may be configured to rotate in use about an axis of rotation; and the main section of each blade extends radially outwards, preferably substantially at 90°+/−10° to the axis of the rotation. The blades may each comprise an inclined section extending from the hub, wherein the main section extends from the inclined section (that is, the inclined section is inward of the main section relative to the axis of rotation (where the hub is inward of the inclined section)), preferably wherein the inclined sections are inclined at an angle of 30° to 90°, and more preferably 35° to 56°, to an imaginary line extending at a right angle to the axis of rotation, and/or wherein the inclined sections each extend in the same direction along the axis of rotation.

In another aspect of the invention, there is disclosed an ice knife comprising two or more blades extending axially radially away from a central hub having an axis of rotation. The blades each comprise an inclined section extending radially outwards from the central hub and inclined at an angle of 30° to 90°, and more preferably 35° to 56°, to an imaginary line extending at a right angle to the axis of rotation, the inclined sections each extending along the same axial direction. The blades each have a main section extending radially outwards from the inclined section substantially at 90°+/−10° to the axis of the rotation.

The ice knife described above may be advantageous over the prior art in that having the blades each extending first axially (on the inclined sections) at the angle of 30° to 90° to the axis of rotation from the central hub, and then radially outwards (on the main sections) from the inclined sections at approximately 90°+/−10° to the axis of rotation, may permit satisfactory ice crushing by lifting the blades up, whilst still potentially permitting use of common tooling with a chopper blade. Additionally, this also may permit a single-piece construction as both blades extend from a hub. Moreover this may allow both blades to act on a drive shaft to which they are connected via the hub at the same point, rather than at different points as they might be if they were attached directly to a drive-shaft element at different heights, thus helping to prevent bending of the drive shaft due to unequal forces and vibration.

Preferably, the two or more blades have substantially blunt leading edges. This may help prevent metal fragments getting into food being processed, may simplify manufacturing, and may make results more predictable.

Optionally, the two or more blades have leading edges extending radially at an angle of approximately 90°-150° to the direction of rotation, preferably wherein the blades extend in a straight line. This can help to prevent ice being projected directly against the sides of the container in which the ice knife is used, and can improve ice crushing.

Potentially the two or more blades may each further comprise a tip section extending radially outwards from the main section at an angle of between 10° and 55° to the imaginary line. Tip sections forming this kind of angle may help to prevent jamming.

In a further optional variant of the ice knife, the radial extent of the two or more blades away from the axis of rotation may be substantially the same. This may help to balance the knife.

The tip sections of each of the two or more blades may potentially have respective, different axial extents along the axis of rotation. This varying of the axial extent of the tip sections may help increase the volume processed.

Preferably, the main sections have substantially the same length, and the axis of rotation is offset relative to a centre of gravity of the hub. This may simplify manufacturing.

In a further variant the inclined sections may extend axially at least 12 mm from the hub, for raising the main sections to an axial plane that may be particularly suitable for ice-crushing.

In another preferable variant the blades and hub are integrally formed, preferably as a single sheet of metal of substantially uniform thickness. This may simplify manufacturing.

Optionally the ice knife may have an axially-extending stem for facilitating manual attachment/removal of the knife to a suitable drive shaft, preferably wherein the stem is substantially identical to one used on a chopper tool. This may improve manual manipulation of the ice knife.

In another aspect of the invention, a food processing attachment is disclosed comprising the above-discussed ice knife, and a container within which the ice knife is located. The container is configured to receive ice therein for crushing by the ice knife. A motor seat is provided configured to detachably receive a motor unit, and a drive shaft and/or gearing is provided configured for conveying rotational drive from the motor unit located in the motor seat to the ice-knife for driving the rotation of the ice knife. The attachment may provide a suitable device in which to use the ice knife.

In another aspect of the invention, a kit of parts is disclosed comprising a motor unit, preferably a hand-blender motor unit, and the above-discussed attachment. The motor unit may drive the attachment.

Preferably, the motor unit further comprises a control module configured to detect a presence and/or absence of the attachment and/or knife, and/or a lid associated with the container of the attachment, and responsive to this detection to carry out at least one of the following processes:

a) present a user-interface corresponding to an ice-crushing mode to the user, b) prevent activation of a motor of the motor unit, c) limit the speed of rotation of the motor of the motor unit to within a predetermined range suitable for ice-crushing, d) where absence of a component is detected, present information related to the attachment of the component to the user, e) present a recipe to the user.

The utility of the device may thus be increased.

In another aspect of the invention, an ice-crushing (or ice-processing) insert is disclosed, said insert comprising a platform section, preferably columnar, and a planar, preferably discoidal, section attached or being removably attachable to the platform section, the planar section being configured to divide a container in which the insert is placed into an ice-crushing area and a crushed-ice-storage area, the planar section having apertures defined therein dimensioned to permit the passage of ice slivers of a pre-determined size there through. The platform section acts to raise the planar section to a position where it can divide a container along a plane into an ice-processing area and a crushed-ice-storage-area. The platform section may optionally be a drive shaft of a kitchen appliance, preferably wherein the planar section is supported on the drive shaft.

Preferably the apertures extend concentrically on the planar section with a tool bearing provided on the insert. This may improve ice-crushing.

In another aspect of the invention, a kitchen appliance is disclosed comprising the ice-crushing insert described herein.

In another aspect of the invention, an ice-knife is disclosed comprising two or more blades having substantially blunt leading edges.

In another aspect of the invention, a kit of parts is disclosed comprising an ice-knife tool (optionally as described herein), a chopper tool, a container in which the ice-knife and the chopper tool may be received to receive rotational drive, and a motor unit to which the container may be removably attached to receive rotational drive, where the ice-knife and the chopper tool each comprise substantially identical plastic mouldings.

In another aspect of the invention, a method of manufacturing food processing tools is disclosed comprising steps of:

a) providing a chopper blade b) providing an ice knife blade c) making a chopper tool by over-moulding plastic onto the chopper blade using a mould, and d) making an ice knife by over-moulding plastic onto the ice-knife blade using the (same) mould.

Preferably, the step(s) of providing the chopper blade and/or providing the ice-knife blade comprise a step of punching a metal sheet to form the chopper blade and/or ice-knife blade.

Preferably the step of providing the ice-knife blade comprises bending blades of the ice-knife so as to extend away from a hub along the majority of their length radially outwards at a height suitable for ice-crushing, preferably approximately 12 mm above the hub.

In another aspect of the invention, a chopper tool is disclosed having a lower blade and a higher blade extending at different axial heights relative to an axis of rotation, preferably wherein the blades each have cutting edges formed by cutting slopes, wherein the slope of the lower blade faces the slope of the higher blade.

The invention also encompasses a kit of parts for constructing any of the apparatuses or apparatus elements herein described.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

Whilst the invention has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances, and any reference to "food" herein may be replaced by such working mediums.

The invention described here may be used in any kitchen appliance and/or as a stand-alone device. This includes any domestic food-processing and/or preparation machine, including both top-driven machines (e.g. stand-mixers) and bottom-driven machines (e.g. blenders). It may be implemented in heated and/or cooled machines. It may be used in a machine that is built-in to a work-top or work surface, or in a stand-alone device. The invention can also be provided as a stand-alone device.

As used herein, the term 'ice knife for a kitchen appliance' preferably connotes a bladed tool of a kitchen appliance suitable for processing ice, more preferably wherein the processed ice has a grain size of more than 0.5 mm, still more preferably more than 2 mm, yet more preferably between 3 mm and 14.5 mm.

BRIEF DESCRIPTION OF DRAWINGS

One or more aspects will now be described, by way of example only and with reference to the accompanying drawings having like-reference numerals, in which:

FIGS. 5a-5f show various side-on views in cross-section of potential leading edge shapes to be used for the blade of the ice-knife of FIG. 1;

FIG. 6 shows a side-on drawing of an ice-crushing insert according to a second embodiment of the invention;

FIG. 7 shows a top-down drawing of the ice-crushing insert of FIG. 6 in plan;

FIG. 8 shows a side-on, cut-away drawing of a food processing attachment according to a third embodiment of the invention;

FIG. 9 shows a side-on, schematic, simplified drawing of a food processing appliance including the attachment of FIG. 8, the insert of FIG. 6, and the ice-knife of FIG. 1;

FIG. 10 shows a drawing in plan of a user interface of the appliance of FIG. 9;

FIG. 11 shows a side-on, schematic, simplified drawing of a second food processing appliance including the attachment of FIG. 8, the insert of FIG. 6, and the ice-knife of FIG. 1;

FIG. 12a shows a side-on view of a chopper tool interchangeable with the ice knife of FIG. 1; and, FIG. 12b shows a top-down, plan view of the chopper tool of FIG. 12a.

SPECIFIC DESCRIPTION

Figures 1, 2:
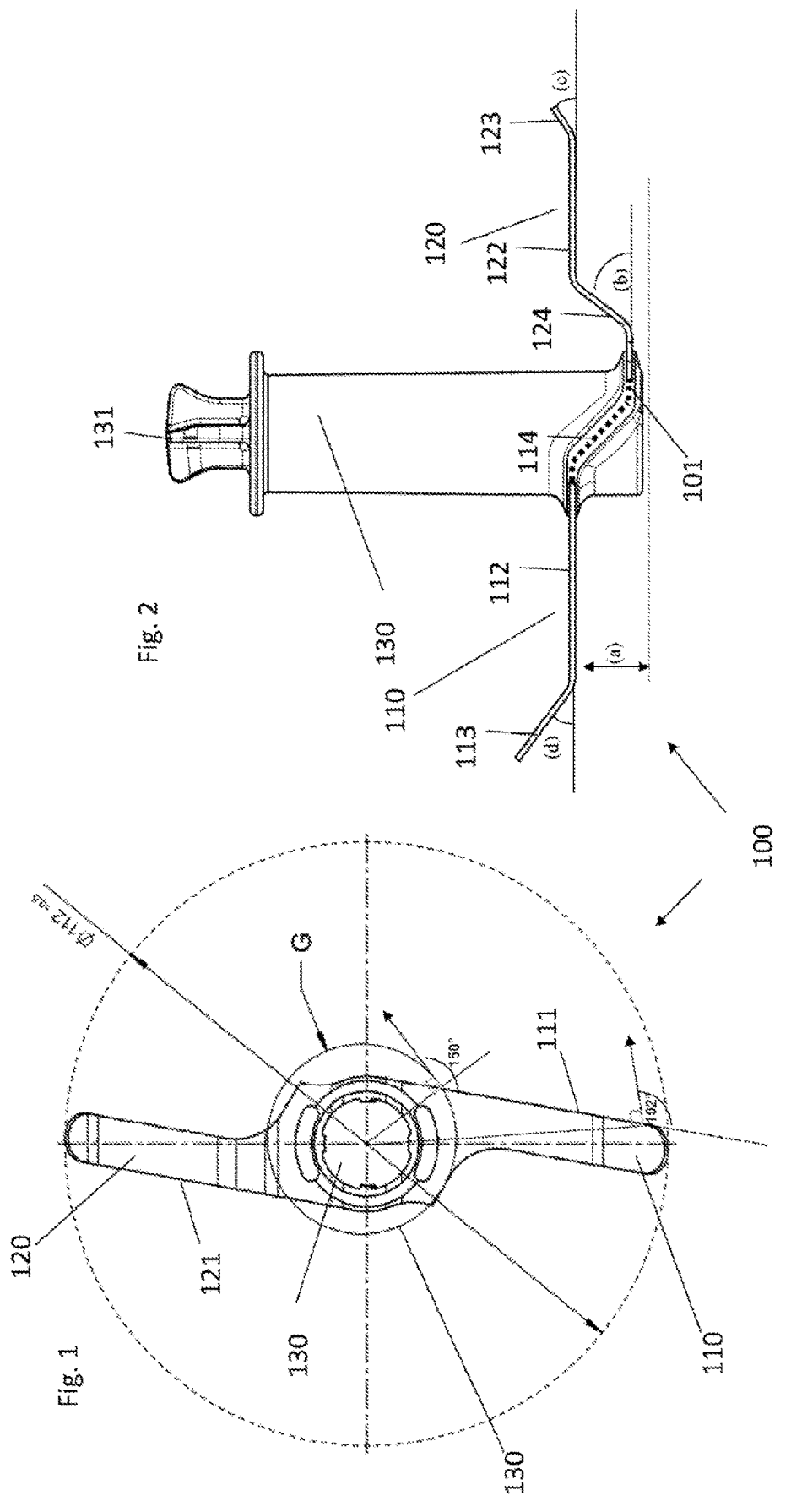
FIG. 1 shows a top-down, partially cut-away drawing of an ice-knife according to a first embodiment of the invention.
FIG. 2 shows a side-on drawing of the ice-knife of FIG. 1.

In a first embodiment of the invention, a two-bladed knife 100 with a first blade 110, a second blade 120, and a plastic stem 130 is shown in FIGS. 1 and 2.

Seen from a top view (FIG. 1), the leading edges 111, 121 of the blade 100 are substantially flat (i.e., extend in a substantially straight line) along the majority of their length, and should preferably be substantially flat along 90% or more of their length. This results in an angle between the leading edge and the peripheral direction of rotation (i.e., the angle separating the blade, and a line drawn at a right-angle to an imaginary line extending from the axis of rotation) close to 90° towards the outside of the blade. In the example shown in FIG. 1 it is between 102° at the outermost point of the blade and 150° on the innermost point where the blade meets the plastic stem 130. This reduces the tendency of hard food to be trapped between blade 100 and the wall of a container in which the blade is deployed. It also means that ice smashed by the leading edges 111, 121 of the blade will tend to be projected close to a tangent to the direction of rotation, meaning that it travels further, and falls further, before impacting with the container in which the knife 100 is deployed, lowered collisions speeds and lessening damage. Additionally this tends to give crushed ice more time to fall into the space below the blades, without being processed again, if the ice has already reached a sufficient fineness.

Viewed from a side view (FIG. 2), both blades 110, 120 consist of a flat and horizontal (i.e., extending at 90°+/−10° to the axis of rotation, and more preferably 90°+/−5°, and more preferably still approximately 90°) main section 112, 122, which is on the same level (i.e., extending in substantially the same axial plane) for both blades 110, 120. The height of both main sections 112, 122 (e.g., the sections making up the majority of the combined length of the blades) above the container bottom (a) defines the fineness of the results. The height (a) is largely or entirely determined by the height of the blades 110, 120 above the bottom of plastic stem 130 (i.e., the opposite end to the finger-grip 131), with the only addition being a clearance from the container of less than 5 mm, and more preferably 1-2 mm to facilitate rotation. The distance between container bottom and blades 110, 120 allows the already processed small food pieces to accumulate under the blades 110, 120, without being processed again, thus determining the maximum grain-size of crushed ice produced. The smaller the height (a), the finer the result; the bigger the height (a), the coarser the results. The height (a) is preferably selected to give an average grain-size of more than approximately 2 mm (i.e., that typical for shaved ice), and more preferably in the approximate range of 3 mm to 14.5 mm after a suitable processing time after which the ice will have been reduced to a desired end-point average grain-size, and preferably one such that no more ice standing on the base of the container is crushed by the blade during continued processing so as to avoid over-processing. An example of such processing by the blade would be processing of approximately 5 seconds to 2 minutes at a speed equal to or more than approximately 100 RPM. A height (a) of approximately 14.5 mm is preferred for crushed ice. The height (a) may be measured from the blade to the bottom of the container in which the knife 100 is deployed, or it may be measured to the top of an insert (such as the insert 200 described later) with which the knife 100 is used in combination.

Figure 12B:
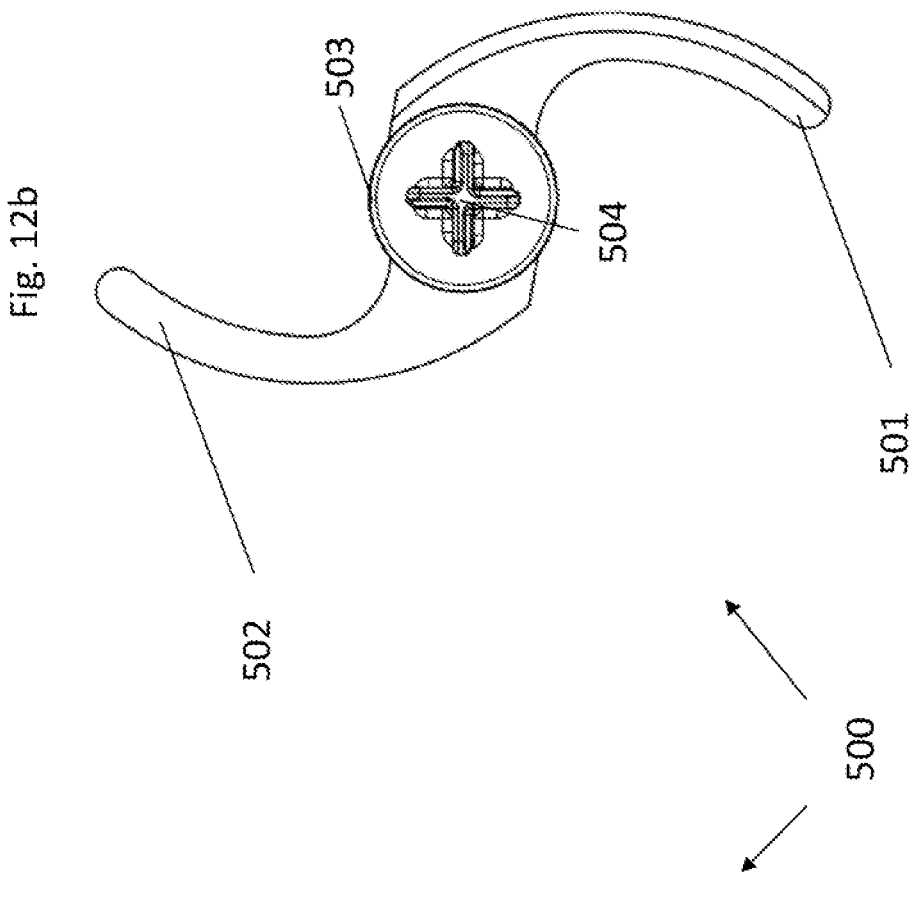
Figure 12A:
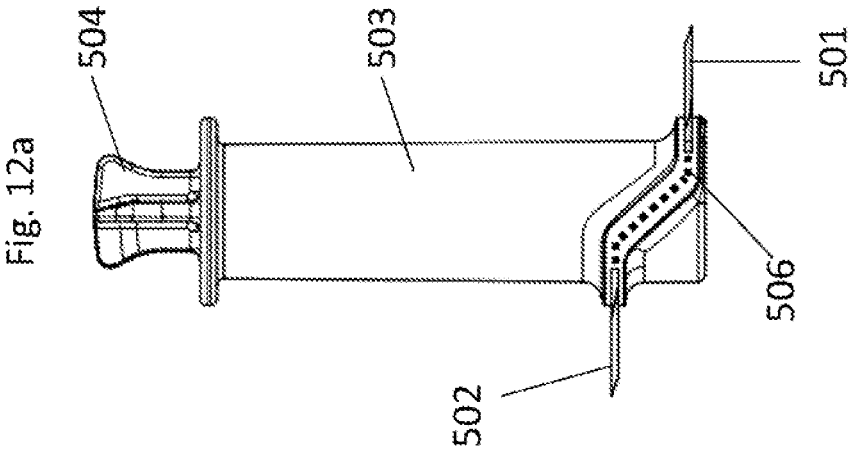

The two blades 110, 120 are connected to each other via a lowered section 101, which transitions into the two blade main sections via two inclined sections 114 and 124 (in the view shown in FIG. 2, the inclined section 114 and part of the lowered section 101 are behind the stem 130 surface and so are shown using dashed lines—similar dashed lines are used in FIG. 12a). This means that both blades 110 and 120 enter the stem at different heights, but connect to (and thus act of) the drive shaft at the same axial location (thus balancing its effect). This design allows to use the same stem also for regular, sharp knifes. As described before, those knifes are required to have one knife close to the bottom of the container. Using the same stem for both the regular knife and the ice knife 100 reduces cost, because the same plastic mould can be used for both knifes. Finally, forming the blades 110, 120 as a single piece connected by the lowered section 101 allows the metal part of the knife 100 to be formed from a single piece of sheet metal by e.g., punching, thus simplifying manufacturing. The bends may be formed by bending the metal sheet to the desired degree.

Providing at least two blades 110 and 120 symmetrically balances the knife 100. This refers not only to balancing in the sense of balancing the centre of gravity, but also to balancing the force of food being processed by the knife 100. This is different to the situation seen in the prior art where a single blade might be used with a counter-weight to counter-balance the blade, which can balance a centre of gravity of the knife, but will not balance the forces acting on the knife due to food being processed by it. Multiple blades 110, 120, also increases the work-rate of the knife 100. Whilst two blades 110, 120 are disclosed, the number of blades may be three or more.

The inclined sections 114 and 124 have the purpose to allow using the same mould to make the plastic stem 130 for the ice crushing knife 100 as well as an additional regular chopper knife (not shown). For the regular knife, both its blades need to be on different levels. The blades 110 and 120 therefore copy the geometry of the corresponding regular knife (e.g., the angles of the inclined sections 114 and 124 to the hub may differ), to allow the use of the same stem mould. Both blades 110 and 120 are preferably at least partially overmoulded by plastic.

The blades 110, 120 are preferably made of a food-safe metallic material such as stainless steel. The blades 110, 120 may be integrally formed to simplify production. The stem 130 is preferably made of a food-safe (e.g., BPA-free) plastic, such as, for example, POM, PA6 or other PA types, or HDPE. The stem 131 preferably has a grip formed at the top to enable manual manipulation of the tool assembly. Alternatively, instead of being metal overmoulded with plastic, the tool 100 could be a single-piece metal construction made of the same material as the blades 110, 120.

Figures 3, 4:
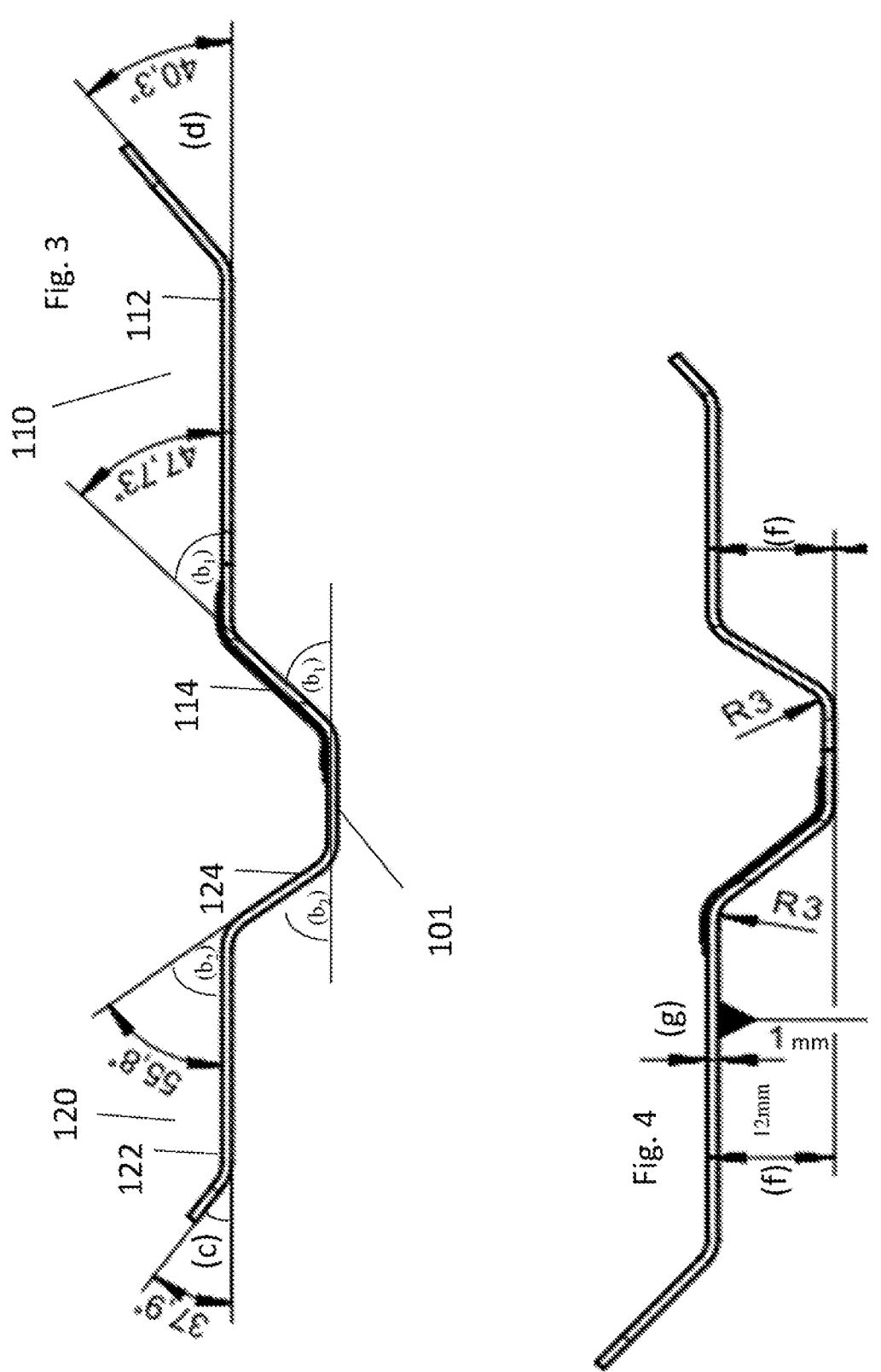
FIG. 3 shows a side-on, in-section drawing of the blade of the ice-knife of FIG. 1 demonstrating various bend-angles.
FIG. 4 shows a side-on, in-section drawing of the blade of the ice-knife of FIG. 1 demonstrating various vertical heights and thicknesses.

The bend angle (b) between the lowered section 101 and inclined sections 114, and 124 is between approximately 30 and 90°, but preferably (especially for any angle that is not covered by an over-moulding and thus supported by the moulding and not acting directly on the food) approximately 35° and 56°. For example, as shown in FIG. 3, which shows an example of angles that may be used, the angle (b₁) between the lowered section 101 and the inclined section 114 may be 47.73 degrees, whilst the angle (b₂) may be 55.8 degrees. Small angles, particularly those smaller than 35° result in undesired finer processing results, since a larger portion of the blade remains at a low height. Larger angles, particularly those significantly larger than 60°, reduce the stiffness of the blades 110, 120, which results in unfavourable deformation of the blade 110, 120 under load, which can result in breakage of the plastic stem 130 during use. Using lower bend angles increases the peripheral stiffness, which leads to a more robust design, especially compared to the prior art.

Both blades 110 and 120 have respective inclined tip sections 113, 123, which are bent towards the flat main sections 110 and 120 by angles (c) and (d). Both angles (c) and (d) are between approximately 10° and 55° and preferably approximately 40°+/−5°. For example, as shown in FIG. 3, (c) may be 37.9 degrees whilst (d) may be 40.3 degrees. The angled tip sections 113, 123 further reduce the risk of food getting blocked between the blade 100 and the container wall as, since they are at a non-right-angle to the wall they act to push material trapped between the blade 100 and the wall out of the gap.

Both tip sections 113 and 123 are of different length, resulting in different heights of the outermost point above the container bottom, but in similar outer diameters (a similar or substantially the same radial extent away from the stem 130). The similar outer diameters are necessary to achieve a balanced knife (i.e., one where the centre of mass is substantially at the central axis of rotation of the blade 100 to avoid vibration), whereas the two different lengths of the tip sections 113 and 123 (resulting in two different tip heights) form two different cutting planes at the outside of the bowl, where most of the processing material accumulates during use. This improves the evenness of the processing result compared to two tip sections 113, 123 with similar length and reduces the processing times.

The shorter tip section 123 is adjacent to the main section 122, whereas the longer tip section 113 is adjacent to the main section 112. The axis of rotation is offset relative to the centre of gravity of the lowered section 101 in order to compensate for this, such that the centre of gravity of the knife 100 as a whole is substantially at the axis of rotation. This additionally leads to the two main sections 112 and 123 to be of approximately the same length, thus simplifying manufacturing.

As shown in FIG. 4, the major part of the height of the blades main sections 112 and 122 above the bottom of the plastic stem 130 consists of the height (f) of the main sections 112 and 122 above the lowered section (or hub)

101. This height (f) is preferably approximately 12 mm. The thickness of the blade assembly (g) is also indicated as being approximately 1 mm.

The term "blunt" or "dull" as used herein refers to a blade having a leading edge of sufficient bluntness that it cannot, under ordinary circumstances during manual attachment and removal of the blade 100, cut human skin. This also ensures that the user is safe during attachment and removal of the blade 100. A "blunt" blade may also entirely lack any serrations.

Bluntness of the blade may result from the shape of the leading edge of the blade. Various examples of blunt leading edges are shown in FIGS. 5a-5f. For example it may have a rounded leading edge 111a as in FIG. 5a, a square leading edge 111b as in FIG. 5b, a vertical leading edge 111c connected to the horizontal upper and lower surfaces of the blade by bevelled contours 111c1 such that no angle of less than 90 degrees is formed as in FIG. 5c, a vertical leading edge 111d connected to the horizontal upper and lower surfaces of the blade by rounded contours 111d1 as in FIG. 5d, a hammer-shaped leading edge 111e wider than the main part of the blade 111e1 as in FIG. 5e, or a narrower (but still blunt) leading edge 111f as in FIG. 5f. Features of one of the above leading edges may be combined with another to result in a similarly blunt leading edge—for example the hammer-shape of FIG. 5e may have the rounded contours of FIG. 5d or a rounded leading edge as in FIG. 5a.

Each of these leading edges 111a-111f has advantages. For example those leading edges where knife only begins to narrow towards the leading edge (e.g., those of FIGS. 5a-5d) are simple to manufacture. That of FIG. 5e can be used with a knife that is generally thin, and can increase the momentum of the blade. That of FIG. 5f can be used where a narrower, but still blunt, area of the leading edge is desired for enhancing cracking of ice particles.

Smoothing of the leading edges 111, 121 may also promote bluntness, for example by filing them, sanding them, or otherwise applying abrasion to remove any sharp edge. More generally a lack of angles smaller than 90 degrees being formed at the leading edges 111, 121 also results typically in bluntness.

The leading edges of the blades 111, 121 with this design do not need to be sharpened (i.e., they can be blunt or dull) to prevent damage from hard foods. This is advantageous as this makes them cheaper to manufacture and means that they do not need to be replaced when they become blunt. It also means that they are less likely to become damaged and to shed metal fragments. If the blade is dull, the performance is constant over lifetime, a sharpened blade would have a decreased performance after some uses with hard food. For example, the blades 110, 120 may be manufactured by simple punching of sheet metal without the need for an additional sharpening step or the need for laser cutting.

FIGS. 6 and 7 show an ice crushing insert 200 according to another embodiment of the invention. As shown in FIG. 6 this ice crushing insert 200 comprises a planar, preferably discoidal section 201, and a columnar section 202. The columnar section 202 serves as a platform to raise the planar section 201 to a height within the container in which the ice crushing insert 200 is deployed, at which the planar section 201 serves to divide the container into two compartments such that crushed ice being processed above the planar section 201 of a desired maximum particle size falls through the apertures 203 within the planar section to the area beneath it, where it is no longer processed.

The apertures 203 are dimensioned such that ice crushed to a predetermined particle diameter can fall through. Preferably this size is in the approximate range of 2-6 mm. Over-processing of ice until it becomes "snow" is thus avoided. The apertures 203 are preferably concentrically arranged with the axis of rotation of an ice-knife (which may be the ice knife 100 disclosed above). As such the apertures 203 extend along the direction of rotation of the ice-knife, facilitating the passage of crushed ice crushed by the ice-knife through the apertures 203 as fragments of ice crushed by the ice-knife will be projected substantially along this direction or at a tangent to it. Concentrically arranging the apertures 203 also has the advantage of providing them all along the direction of axial extension of the blades, as does the discoidal shape of the planar section 203. However, other shapes for the apertures 203 may be used, including holes, radially-extending slits, a square grid etc.

If used with the ice knife 100, the insert 200 extends the collection space under the blade further, allowing larger quantities of ice to be processed in one operation.

The planar section 201 defines notches 206 about its periphery 205. These notches 206 receive ribs or similar features of the container in which the ice crushing insert 200 is provided to prevent the ice crushing insert 200 rotating and to securely locate it within the container. The periphery 205 may form a slight, unapertured slope facing toward the middle of the planar section 203 to encourage ice towards the planar apertured inner segment of the planar section 203.

The substantially flat, planar shape of the planar section 201 efficiently divides the container in which it is deployed into two compartments. It is also more easily manufactured than a non-planar shaped element. Additionally, space is saved. Furthermore, as the planar section 201 only extends beneath the ice knife with which it is used, ice is not projected directly sideways against it by the knife, but instead tends to fall a distance first losing velocity as it does so, impacting with the planar section 201 with less force and thus helping to avoid over-processing.

Space-saving can be further promoted by making the columnar section 202 and the planar section 201 separable. In this case multiple planar sections 201 may be provided with differently sized and/or shaped apertures.

As the apertures 203 lead only straight downwards (i.e., across the narrowest width of the apertures), and not sideways, the transit of ice through the apertures is smoother and ice is less likely to get stuck. The bearing 204 may be provided on either of the columnar section 202 or the planar section 201.

An apertured bearing seat 204 is provided centrally in the planar section 203. The knife may be seated here, and extend through the aperture in the seat 204 to receive rotational drive by coupling to a drive shaft or gear within the columnar element 202. Alternatively the columnar element 202 may extend through the planar section 203 and may have the seat 204 at its upper end.

The columnar element 204 may be flared towards its lower end to direct falling ice fragments away from the meeting point between it and the container in which it is used. This flaring causes down-ward falling ice fragments to be deflected sideways away from the columnar element 204.

The ice crushing insert 200 is preferably made of a food-safe (e.g., BPA-free) plastic, such as, for example, POM, HDPE, PA6 or other PA types. The bearing seat 204 may feature a low-friction material such as Teflon™ to reduce wear. Sealing elements such as washers, o-rings etc. may be provided at the bearing seat 204 to prevent water/food ingress into the aperture of the bearing seat 204 when the ice knife is attached to it by sealing against the ice knife.

Both the insert 200 and the ice-knife 100 are preferably dishwasher safe. This means that they comprise materials that will not degrade in a dishwasher (e.g., do not include plastics that degrade or otherwise change chemically to a degree noticeable to the human eye at temperatures in the range 20-80 degrees centigrade over a product lifetime of 1-8 years when exposed to water or standard dishwasher cleaning materials at that temperature). It also means that lubricant oils that may dry out during dishwashing should be avoided.

An exemplary embodiment of a food processing device 300 incorporating the ice knife 100 and the ice crushing insert 200 is shown in FIG. 8. The food processing device 300 has a base 301 on which it stands freely. The base 301 may be attachable to a device such as a food processor motor base such that the knife 100 can receive drive from it by connecting through the bearing 306, which is connected to the knife 100 by gearing (not shown). The base 301 supports a container 302 which is enclosed by an apertured lid 303. The lid 303 supports a motor unit seat 304 that can receive the motor unit of either a hand-blender or hand mixer, and the knife 100 can receive drive from the motor unit via the gearing 305 located within the seat 304, which is in turn connected to the knife 100 by intervening gearing (not shown).

The container 302 has vertically-extending ribs 307 extending from an inner surface thereof for locating the planar section 201 of the ice crushing insert 200. The columnar section 202 is also secured by a matching protrusion/indent or other fixing means. The ice crushing insert 200 is thus securely located within the device 300. The ribs 307 also aid in directing food away from the inner surface towards the knife 100.

FIG. 9 shows a highly simplified, schematic drawing of a food processor base 400 on which the device 300 including the insert 200 and the knife 100 has been deployed. The ice knife 100 receives drive from a motor 401 located in the base 400 via a drive-shaft 402 which may be wholly provided on the base 400 or only partly provided there, with the rest provided on the device 300 and attaching to the drive shaft 402 on the base 400 with a releasable attachment. The base 400 also has a control module 403 including a processor, memory, wireless/wired electronic communication means such as a wifi module, user interface means such as a touch-screen display and/or a physical control knob/switch. The control module 403 is in electronic communication, preferably two-way communication so that both electronic instructions and electronic feedback from sensors such as Hall sensors for detecting motor speed and torque can be transmitted and received, with the motor 401. The speed of the motor 401 is controlled by the user using the control module 403 either directly by inputting instructions into the user interface, or indirectly using a mobile device (not shown) in wireless electronic communication with the base 400. Feedback to the user may be similarly provided by the control module 403 either directly through visually, aurally, or through vibration, or indirectly through a mobile device.

The completed assembly 400, 300, 200, 100 preferably has tool recognition means associated with it. For example, the control module 403 should be able to detect the presence and/or absence of the device 300 and/or lid 303 and/or ice crusher insert 200 and/or ice knife 100. This may be achieved by the control module 403 being provided with an RFID module for detecting an RFID chip associated with the element to be detected, NFC module, inductive loop arrangement, magnet/reed-switch arrangement, microswitch depressed by a corresponding push-rod (spring-loaded or otherwise) or other protrusion on the element to be detected, or other means of presence/absence detection.

The control module 403 may respond to the result of the above-discussed presence/absence detection by limiting and/or preventing the activation of the motor 401. For example if the control module 403 may be prevented from running if any or all of the device 300 and/or lid 303 and/or ice crusher insert 200 and/or ice knife 100 are not present, thus increasing safety and avoiding pointless operation. The control module 403 may also display a warning to the user indicating which part is missing and how to attach it. The control unit 403 may also limit the speed of the motor to correspond to a rotary speed of the knife 100 suitable for crushing ice—for example the range 1000 RPM to 5000 RPM.

Alternatively or additionally, the control module 403 may enter into an "ice crushing mode" responsive to detecting that any or all of the device 300 and/or lid 303 and/or ice crusher insert 200 and/or ice knife 100 are present. An example of the a user interface displayed by the control module 403 either directly via a touch screen or indirectly via a mobile device responsive to going into "ice crushing mode" is shown in FIG. 10. The control module 403 may seek confirmation that "ice crushing mode" is desired by asking for user feedback via a yes/no dialogue 403*a*. A speed or range of selectable speeds suitable for ice-crushing may be shown to the user via slider bar 403*b* (or a dial, numerical input, or other input). For example the speed range may extend from 1000-5000 RPM, and may differ to that displayed for other food processing activities such as blending or chopping. Alternatively or additionally slider bar 403*b* (or an additional slider bar or other input) may be used to select a desired average ice-grain size, either by displaying general options such as "coarse", "fine", or by displaying the size in mm or other suitable units. Whilst in "crushed ice mode" a suggested recipe dialogue 403*c* may suggest potential recipes corresponding to the user selections in terms of speed, grain-size, or simply for crushed ice in general, accompanied by a picture of the finished food product prepared according to the recipe. The recipe may be either internally stored in a memory of the module 403, or provided to it from an external server responsive to telemetry from the module 403 indicating user input and machine status (including the presence/absence status of the elements discussed above). Pre-selected user preferences may also be used in determining the recipe to be displayed—for example if previous user input indicated that the user did not consume alcohol, or was located in a country where the consumption of alcohol was illegal, then only non-alcoholic recipes would be displayed.

Similarly to FIG. 9, FIG. 11 also shows a schematic, highly simplified exemplary embodiment of a hand-blender motor unit 500 releasably attached to the motor unit seat 304 by clips, screw/thread, or other suitable releasable-attachment means. The motor unit 500 has a motor 501 connected so as to impart rotational drive to the knife 100 by drive-shaft/gearing 502 which, similar to shaft 402, may be provided entirely on the motor unit 500 or only partially, and connect to either the bottom or the top of the knife 100. The motor unit 500 also has a control module 503 that can perform all the functions already discussed above with relation to control unit 403.

Whilst ice knife 100 and ice crushing insert 200 are shown being used together in the device 300, it is not necessary to use them together. Insert 200 may be used with any ice knife. Ice knife 100 may be used without insert 200, and located close to the bottom of the container 302.

FIGS. 12*a* and 12*b* illustrate a chopper 500 usable interchangeably with the above-discussed ice knife 100. The chopper 500 has a lower blade 501 for chopping food material close to the bottom of the container in which the chopper 500 is deployed. A higher blade 502 is provided extending at a different location along the axis of rotation of the chopper 500, so as to chop food higher up in the container to the food chopped by the lower blade 501. Both blades 501 and 502 extend away from the axis of rotation. A stem 503, similar to the stem 130 of the ice knife or even the same as it, is provided around the blades 501 and 502, preferably by over-moulding, protecting the drive shaft at the axis of rotation. The stem 503, like the stem 130 with the ice knife 100, allows attachment of the chopper 500 to a drive shaft using suitable lugs or screw-thread within it. The stem 503 is preferably made of plastic, preferably injection-moulded plastic as this is cheaply and easily formed, and preferably plastic that is food-safe and dishwasher safe.

As the initial point of extension of the lower blade 501 away from the stem 503 is the same as that of the blade 120 of the ice knife 100, the same mould may be used to make the stem 503 of the chopper 500 and the stem 130 of the ice knife 100. However, as the lower blade 501 extends directly radially away from the axis of rotation (i.e., in a straight-line as seen in a side-on view) it can cut material close to the bottom of the container in which it is used, whilst the axially-raised blade 120 of the ice knife 100 avoids the creation of "snow" by being a sufficient distance away from the bottom.

A finger grip 504 is provided at the top of the stem 503 for facilitating manipulation of the chopper 500 by the user. The grip 503 may also be made using the same mould as that used to make the grip 131 of the ice-knife 100, and may be similarly integrally formed with its respective stem 503/130.

The blades 501 and 502 of the chopper 500 may be curved substantially away from the direction of rotation to improve chopping performance. They are preferably sharpened, forming a sharp edge capable of cutting material they come into contact with. This sharpening may be achieved by bringing each of the blades 501 and 502 to a point on its leading edge. This point may be an apex between two angled surfaces separated by an acute angle, and more preferably by an angle of 45 degrees or less. The slope of the lower blade 501 preferably faces towards the slope of the higher blade 502, so that they urge food material towards each other. The blades 501 and 502 are preferably formed of stainless steel, and can be inter-connected by a hub 506 similarly to the blades of the ice knife 100.

Electronic communication as discussed herein encompasses both wired and wireless transmission, with or without intermediation by servers, routers, base stations, mobile devices, antennas, processors, electronic memories, packet-switchers, wires, cables (e.g., fibre-optic) and other electronic communication means.

The term "ice" as used herein may be replaced with any other food material of similar (e.g., +/−~30%) hardness or density. For example, nuts such as peanuts may be processed.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. An ice knife for a kitchen appliance, comprising: two or more blades, said blades each having a flat horizontal main section, a hub configured for attachment to a drive shaft of the kitchen appliance, the blades extending from the hub, and the main sections being arranged at the same height above the hub; and an axially-extending stem for facilitating manual attachment/removal of the knife to the drive shaft, the stem supporting the hub such that the main sections are raised above the base of the stem, the height of each main section above the base of the stem being configured such that processed ice collects under the main section in use, wherein the blades each comprise an inclined section extending from the hub, wherein the main section extends from the inclined section, and wherein the two or more blades each further comprise a tip section extending radially outwards from the main section at an angle of between 10° and 55° upwards to an imaginary line extending at a right angle to the axis of rotation.

2. The ice knife of claim 1, wherein the height is configured such that the processed ice has a grain size of between 3 mm and 14.5 mm.

3. The ice knife of claim 1, wherein the height of the main section above the hub is between 5 mm and 30 mm.

4. The ice knife of claim 3, wherein the hub is configured to rotate in use about an axis of rotation; and the main section of each blade extends radially outwards.

5. The ice knife of claim 1, wherein the two or more blades have substantially blunt leading edges.

6. The ice knife of claim 4, wherein the two or more blades have leading edges extending radially at an angle of approximately 90°-150° to the direction of rotation.

7. The ice knife of claim 4, wherein the radial extent of the two or more blades away from the axis of rotation is substantially the same.

8. The ice knife of claim 1, wherein the inclined section extends axially at least 12 mm from the hub, for raising the main sections to an axial plane suitable for ice-crushing.

9. The ice knife of claim 4, wherein the blades and hub are integrally formed as a single sheet of metal of substantially uniform thickness.

10. The ice knife of claim 1, wherein the stem is substantially identical to one used on a chopper tool.

* * * * *